(No Model.) 2 Sheets—Sheet 1.
J. P. COBB.
SUPPLY APPARATUS FOR FEEDERS FOR THRASHING MACHINES.
No. 276,225. Patented Apr. 24, 1883.
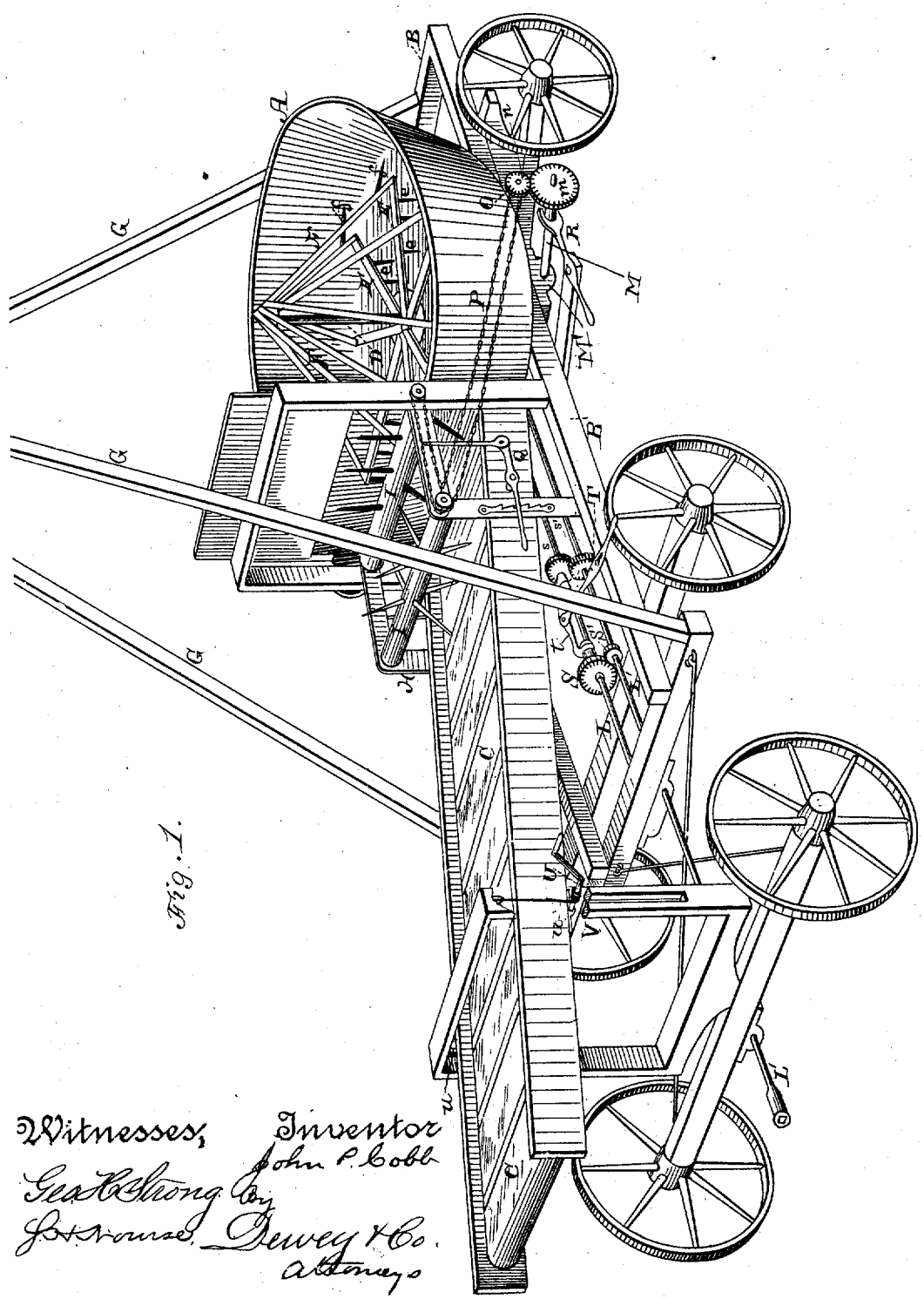
Witnesses:
Geo. H. Strong
J. H. Krouse
Inventor
John P. Cobb
By Dewey & Co.
Attorneys
N. PETERS, Photo-Lithographer, Washington, D. C.

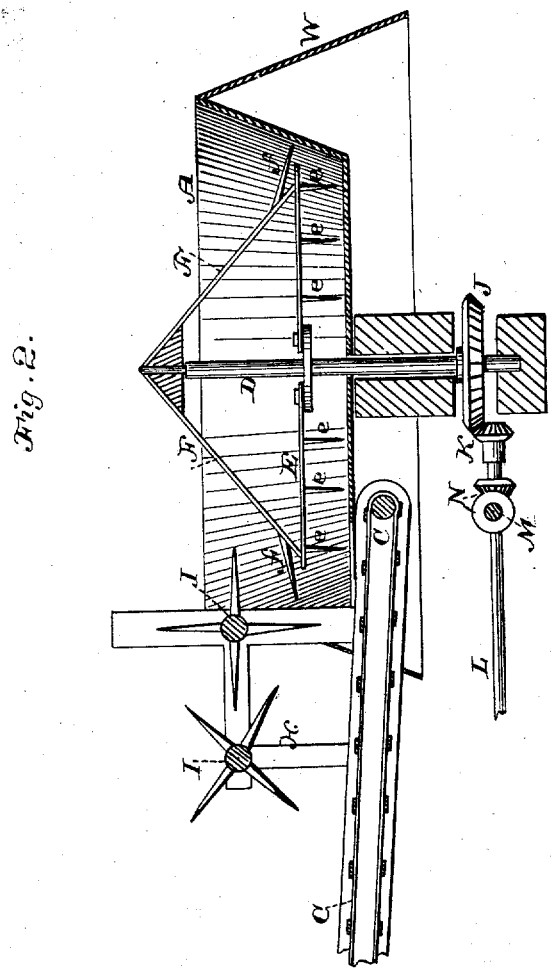

UNITED STATES PATENT OFFICE.

JOHN P. COBB, OF COLLEGE CITY, CALIFORNIA.

SUPPLY APPARATUS FOR FEEDERS FOR THRASHING-MACHINES.

SPECIFICATION forming part of Letters Patent No. 276,225, dated April 24, 1883.

Application filed December 18, 1882. (No model.)

*To all whom it may concern:*

Be it known that I, JOHN PERRY COBB, of College City, county of Colusa, State of California, have invented an Improved Supply Apparatus for Feeders for Thrashing-Machines; and I hereby declare the following to be a full, clear, and exact description thereof.

My invention relates to an apparatus for receiving and conveying unthrashed straw to thrashing-machines; and it consists in certain details of construction, hereinafter described and claimed, which will be more fully explained by reference to the accompanying drawings, in which—

Figure 1 is a perspective view of my invention, and Fig. 2 is a vertical section in the line of the feeder-belt.

The means usually employed to feed unthrashed straw to thrashing-machines is to deposit it from the stack or the header-wagon upon a table in close proximity to the feeder. From this pile the straw is raked down upon the belt by hand.

A is a large pan-shaped receiver having flaring sides, and mounted upon a frame, B, having wheels, by which it may be transported from place to place. The rear side of this receiver is cut away or left open, and the carrier-belt C of the feeder extends from a point of the receiver beneath this cut-away portion to the thrashing-machine. (Not shown.) A vertical shaft, D, extends up through the center of the receiver, and has near its bottom horizontal radial arms E, extending toward the periphery of the receiver. These arms have teeth $e$ projecting downward from their lower sides. Inclined arms F extend from the outer ends of the horizontal arms to the top of the central shaft, D, so as to form a conical frame. These inclined arms have teeth $f$ projecting from a point near their lower ends at a less angle than their own, and when revolved the arms and teeth will loosen up and distribute the mass of straw, which is dropped into the receiver by the derrick-fork, so that it will be fed with regularity upon the carrier-belt and by it carried to the thrashing-machine.

G is the frame of a derrick, the lower ends of which are fitted to the frame-timbers of the bed B, and the derrick-fork (not shown) is suspended from suitable tackle at the top. A frame, H, supports the picker-rollers I above the carrier-belt at the opening of the receiver, and these assist in distributing the straw evenly upon the belt. The vertical shaft D is driven by a bevel-gear wheel, J, at the bottom, beneath the receiver, and a pinion, K, upon the horizontal shaft L, which extends backward beneath the carrier and is connected so as to be driven from the thrasher or its motor by a tumbling-shaft, L'. A transverse shaft, M, is driven from the shaft L by means of bevel-gear N, and from its outer end a chain or belt pulley, O, is driven by means of gear-wheels $n$ $m$, as shown in Fig. 1. The chain or belt P drives the pickers I, which may be raised or lowered by a lever, Q, and they may be stopped altogether by a clutch-lever, R, by which the driving-pulley is thrown out of gear at will, shaft M sliding freely in its journals M'. The carrier-belt C is also driven from the shaft M by suitable gearing or driving-belt. In the present case the tumbling-shaft L' is shown as driving the counter-shaft L by means of gearing S S' $s$ $s'$, by which the speed of the revolving arms and other parts may be regulated, and the whole may be stopped or set in motion by a clutch-lever, T, in the following manner: Gears S' and $s'$ are mounted upon shaft L' between gears S and $s$, and these latter turn with shaft L by means of the ordinary lug and groove. A brace, $t$, connects them and is moved with them by clutch-lever T. When rapid movement is desired gears $s$ and $s'$ are thrown into connection. When slower motion becomes necessary gears S and S' are made to mesh with each other, and when the feeder must be stopped brace $t$, with its gears, is moved to a position midway the extremes. The discharge end of the carrier-belt is elevated or depressed to suit the relative positions of the thrasher and the frame B upon irregular ground by means of a crank-shaft, U, with ropes or chains, and a guiding-frame, V.

Around the outside of the receiver is a diverging apron, W, which protects the machinery from being clogged by deflecting the scattered straw and chaff outward from the machine.

The operation is as follows: The unthrashed straw is dropped by the derrick-fork into the receiver of the apparatus, and the revolving arms loosen and distribute it and carry it around, so that the carrier-belt C will be loaded with it, the pickers I assisting to spread it evenly, so that it will be fed to the thrashing-cylinder regularly. It is impossible to clog the machine. The straw may be thrown upon it to any depth which it will hold, and will be gradually fed to the carrier from below.

Having thus described my invention, what I claim as new, and desire to secure by Letters Patent, is—

1. In a feeding apparatus for thrashing-machines, the receiver A and the revolving toothed arms E F, in combination with the carrier-belt C, substantially as herein described.

2. The receiver A, revolving toothed arms E F, and carrier-belt C, in combination with the pickers I, substantially as herein described.

3. The receiver A, vertical shaft D, provided with toothed arms E F, in combination with the gears J K and shaft L, substantially as herein described.

4. The receiver A, revolving toothed arms E F, shafts D L, and connecting-gears J K, in combination with the pickers I, adjusting-lever Q, driving-belt P, the shaft M, gears N, $m$, and $n$, and the clutch-lever R, substantially as herein described.

5. The receiver A and toothed arms E F, rotating within said receiver, in combination with carrier C for conveying straw from a mass within the receiver, the driving-shafts L L', intermediate gearing, and disengaging and starting mechanism, substantially as herein described.

6. The toothed arms E F, means for rotating them, the receiver A, the endless traveling carrier-belt C, and the supporting-frame journaled beneath the receiver in the frame B, in combination with the crank-shaft U, connecting-ropes $u$, and the guide V, by which the outer end of the carrier is adjusted up or down, substantially as herein described.

7. A feeding apparatus for thrashing-machines, consisting of the receiver A, into which the straw is deposited in bulk, rotating mechanism within said receiver, by which the straw is loosened and distributed, picking and spreading mechanism, and a carrier-belt, by which it is carried to the thrasher, all substantially as herein described.

In witness whereof I hereunto set my hand.

JOHN PERRY COBB.

Witnesses:
WM. C. HENRY,
W. H. CROSS.